UNITED STATES PATENT OFFICE.

JULIEN JOSEPH MONVOISIN, OF MONTREUIL, PARIS, FRANCE.

PROCESS FOR TREATING FRESH MEATS WITH A VIEW TO CONSERVE THE SAME IN A FRESH CONDITION IN OPEN AIR.

1,219,130.

Specification of Letters Patent.

Patented Mar. 13, 1917.

No Drawing.

Application filed November 11, 1914. Serial No. 871,584.

*To all whom it may concern:*

Be it known that I, JULIEN JOSEPH MONVOISIN, of 40 Rue Jules Ferry Montreuil Seine, Paris, in the Republic of France, have invented a Process for Treating Fresh Meats with a View to Conserve the Same in a Fresh Condition in Open Air, of which the following is a full, clear, and exact description.

This invention relates to a process for treating fresh meats with a view to preserve the same in a fresh condition in open air.

Various methods or processes have already been devised in order to conserve meat in open air after its having been treated, but such methods or processes have not heretofore led to satisfactory results.

Now, the process which forms the subject-matter of this invention is based on the combination of the old methods and new means which proceed from recent discoveries of science.

The new process essentially consists: first, in superficially sterilizing the meat by chemical or physical means, as soon as the animal is slaughtered; secondly, in subjecting the so superficially sterilized meat to a vacuum and at the lowest temperature possible, in order to rapidly cool the said meat and, if necessary, eliminate the product means employed for the initial sterilization; thirdly, in moistening the superficial portion of meat on its leaving the vacuum apparatus; fourthly, in afterward drying the said meat in a current of dry and sterile hot air.

As just stated, as soon as the animal is slaughtered, the meat is subjected to a superficial sterilization by the aid of a strong antiseptic or by physical means which destroy the germs which were deposited on the surface thereof during the various manipulations the said meat went through.

As laboratory experiments have shown, it is in fact well known that the germs of putrefaction do not preëxist in a sound meat but are deposited on the surface of the latter by air, whence the said germs rapidly make their way to the interior. For that reason, an energetic and immediate sterilization is required, although it is quite superficial.

The requirement to eliminate the antiseptic employed, in the case of utilizing a chemical agent, and in order not to take to the deficiency of one of the aforesaid processes, leads to the use of a volatile antiseptic, for instance sulfurous acid.

For completely effecting such elimination I employ the distillation under a reduced pressure, while limiting the action of the vacuum to the time which is strictly necessary for subjecting the said antiseptic to distillation.

On the other hand, I work at the lowest temperature possible, in order to cause the meat to be rapidly cooled, an essential condition for the ultimate conservation thereof.

In this manner, in a very short time, I may obtain the cooling of the deep layers of the said meat, which prevents every tendency of the lymphatic glands, highly putrescible bodies, to become altered.

Furthermore, the "post mortem" or after-death action of the digestive diastases is thereby prevented, the latter being paralyzed, better than an antiseptic could do.

Such various effects are obtained by using the vacuum not as a drying means, as on the contrary the apparatus is maintained at the lowest degree of temperature in order to prevent the water distilling, but nevertheless as a sufficient means for eliminating the said antiseptic.

Eliminating the said antiseptic and cooling means are two phenomena which are simultaneously effected in a relatively short time which varies according to the size and nature of the so treated pieces, but which do not exceed a few hours.

In consequence of such preliminary treatments, the said meats are cooled, sterile and quite free from antiseptic when leaving the apparatus.

The said meats are then submitted to moistening. The latter operation may be carried out in various ways, but preferably the said meats are placed in a room, the atmosphere of which is saturated with water vapor and kept sterile either by the presence of ultra-violet rays or by any other means.

In ratio to the low temperature of the said meat when leaving the vacuum apparatus, the water vapor in the moistening chamber is condensed on the surface of said meat and the teguments when so moistened resume their primitive suppleness. The said teguments, after they have become supple and elastic, exactly apply themselves again on to the subjacent tissues.

The said meats may also be moistened either by an atomization, of sterile water on the surface of the said meat, or merely by a direct application. The said moistening may also be effected either when the meats are at a low temperature caused by the action of a vacuum, as aforesaid, or when the meat after having left the vacuum apparatus, has resumed a temperature neighboring the temperature of the circumambient medium.

The meats may then resume their normal appearance under the influence of the following treatment, during which the desiccation thereof will be effected, as above mentioned.

The said last treatment consists in subjecting the said meats to the action of a current of hot and dry air, under the influence of ultra-violet-rays which secure the exact asepsis of the last operation.

Under the action of hot air, the tissues are dried in a uniform manner and to an equal depth on the whole area, which permits of reducing to a minimum the loss of weight caused by the treatment. The tissues are no more separated from one another than in the desiccation by a vacuum; this fact explains why the said desiccation by hot air is uniformly effected throughout, it being favored by the osmose phenomena.

Under the action of hot, dry and very hygroscopic air, the desiccation is very rapidly effected.

During such desiccation, the teguments which have resumed their suppleness and elasticity under the action of the moisture remain attached to the subjacent tissues, so that the product finally obtained is smooth and externally has no tainted portion, the result of which is to maintain the natural appearance of the said meat.

Such natural appearance constitutes one of the features of the meat conserved by this process.

The greases have preserved their primitive color; of a hard condition before their desiccation, the same, under the influence of the hot air, resume their first consistency. The pores of the same become opened, while permitting of the most complete desiccation, a result which is obtained by no one of the processes heretofore known, even after several days' treatment.

Such complete desiccation permits the greases resisting rancidness.

With this process, it would seem that the said meat, so placed at the temperature at which the desiccation is effected, ought to become rapidly rotten. Now, according to my experiments, no symptom of a putrefactive fermentation is shown, because the said meat has been thoroughly and very speedily cooled, in the presence of a strong antiseptic, the effect of which operation was then to destroy every micro-organism and to paralyze the diastases.

The said meat becomes warm again only very slowly from the exterior to the interior, and the degree of progressive desiccation which the said meat reaches, prevents the micro-organisms from becoming active again.

The whole of the operations just described permits meats which are kept in open air without special care, to retain their savor and also their nutritive and organoleptic primitive qualities and have the appearance of fresh meats.

In fact, the fixed meats obtained by this process are covered with a supple and light protective film which is similar to the film offered by a stale meat.

Of course, instead of the sulfurous acid used in the initial treatment of meat, I may employ every other suitable antiseptic substance.

Every chemical substance may also be replaced by any physical means capable to lead to the same result, for instance the ultro-violet rays.

This process may also be used for conserving other organic matter.

Claims:.

1. A process for treating fresh meats for the purpose of keeping the latter in a fresh condition in open air, consisting in superficially sterilizing meat, cooling the said meat by the action of a vacuum, moistening the superficial portion of the said meat, and drying the said superficial portion.

2. A process for treating fresh meats for the purpose of keeping the latter in a fresh condition in open air, consisting: in superficially sterilizing the meat immediately after the animal is slaughtered, cooling the said meat in a vacuum at a low temperature, moistening the superficial portion of the said meat on its leaving the vacuum producing apparatus; and drying the said meat by hot air.

3. A process for treating fresh meats for the purpose of keeping the latter in a fresh condition in open air, consisting: in superficially sterilizing the said meat, immediately after the animal is slaughtered, by means of a volatile chemical substance; cooling the said meat in a vacuum at a low temperature, in order to eliminate the volatile substance, moistening the superficial portion of the said meat, in order to restore the teguments to their primitive suppleness; and drying the superficial portion of the said meat by a current of dry and sterile hot air.

4. A process for treating fresh meats for the purpose of keeping the latter in a fresh condition in open air, consisting: in superficially sterilizing the meat, immediately after the animal is slaughtered, by sulfurous acid, cooling the said meat in a vacuum at a low temperature during a very short time, in order to eliminate the sulfurous acid and produce a thin and regular aseptic protecting film on the surface of the said meat, moistening the superficial portion of the said meat, in order to restore the teguments to their primitive suppleness, and drying the superficial portion of the said meat by a current of dry and sterile hot air, in order to strengthen the protective film.

5. A process for treating fresh meats for the purpose of keeping the latter in a fresh condition in open air, consisting: in superficially sterilizing the meat, immediately after the animal is slaughtered, by sulfurous acid, cooling the said meat in a vacuum at a low temperature during a very short time, in order to eliminate the sulfurous acid and produce a thin and regular aseptic protecting film on the surface of the said meat, moistening the superficial portion of the said meat in order to restore the teguments to their primitive suppleness, and drying the superficial portion of the said meat by a current of hot and dry air made sterile by ultra-violet rays.

The foregoing specification of my "process for treating fresh meats with a view to conserve the same in a fresh condition in open air," signed by me this twenty-ninth day of October, 1914.

JULIEN JOSEPH MONVOISIN.

Witnesses:
    LUCIEN PAILLARD,
    ELY E. PALMER.